United States Patent [19]

Larson

[11] Patent Number: 4,534,449
[45] Date of Patent: Aug. 13, 1985

[54] PERFORATING, SEAL-GREASING APPARATUS AND METHOD

[75] Inventor: Eldon E. Larson, Kitsap County, Wash.

[73] Assignee: Eltech Innovations Inc., Bremerton, Wash.

[21] Appl. No.: 532,016

[22] Filed: Sep. 14, 1983

[51] Int. Cl.³ .............. F16N 21/04; F16N 5/02; G01R 31/22; A61M 5/32
[52] U.S. Cl. .............. 184/105.2; 141/329; 222/149; 222/495
[58] Field of Search .............. 184/105 R, 105 A, 14, 184/109, 28; 222/149, 495; 141/19, 329, 330

[56] References Cited

U.S. PATENT DOCUMENTS

| 537,099 | 4/1895 | Young | 222/149 X |
|---|---|---|---|
| 682,060 | 9/1901 | Grimshaw | 222/149 X |
| 764,537 | 7/1904 | McGinty | 222/149 |
| 779,798 | 1/1905 | Palm | 222/149 |
| 985,066 | 2/1911 | Rose | 222/149 X |
| 1,560,689 | 11/1925 | Holt et al. | 222/495 X |
| 2,643,801 | 6/1953 | Kollmeyer | 222/149 X |
| 3,554,324 | 1/1971 | Watley et al. | 141/329 X |
| 3,589,470 | 6/1971 | Dorn | 181/5.1 |
| 3,669,220 | 6/1972 | Andersson | 184/105 |
| 3,884,230 | 5/1975 | Wulff | 128/221 |
| 4,201,208 | 5/1980 | Cambio | 141/329 X |
| 4,388,591 | 6/1983 | Lannan | 141/329 X |

Primary Examiner—David H. Brown
Attorney, Agent, or Firm—Seed and Berry

[57] ABSTRACT

An improved method and apparatus for perforating and applying grease through a resilient seal using a solid or hollow needle, said solid needle puncturing the seal with a sufficiently small perforation that, as the device is maintained in contact with the seal and pressurized lubricant is applied, the perforation is hydraulically opened by the grease, and wherein, upon removal of the device, the perforation will self-seal due to the resilient character of the seal material.

9 Claims, 13 Drawing Figures

FIG.8

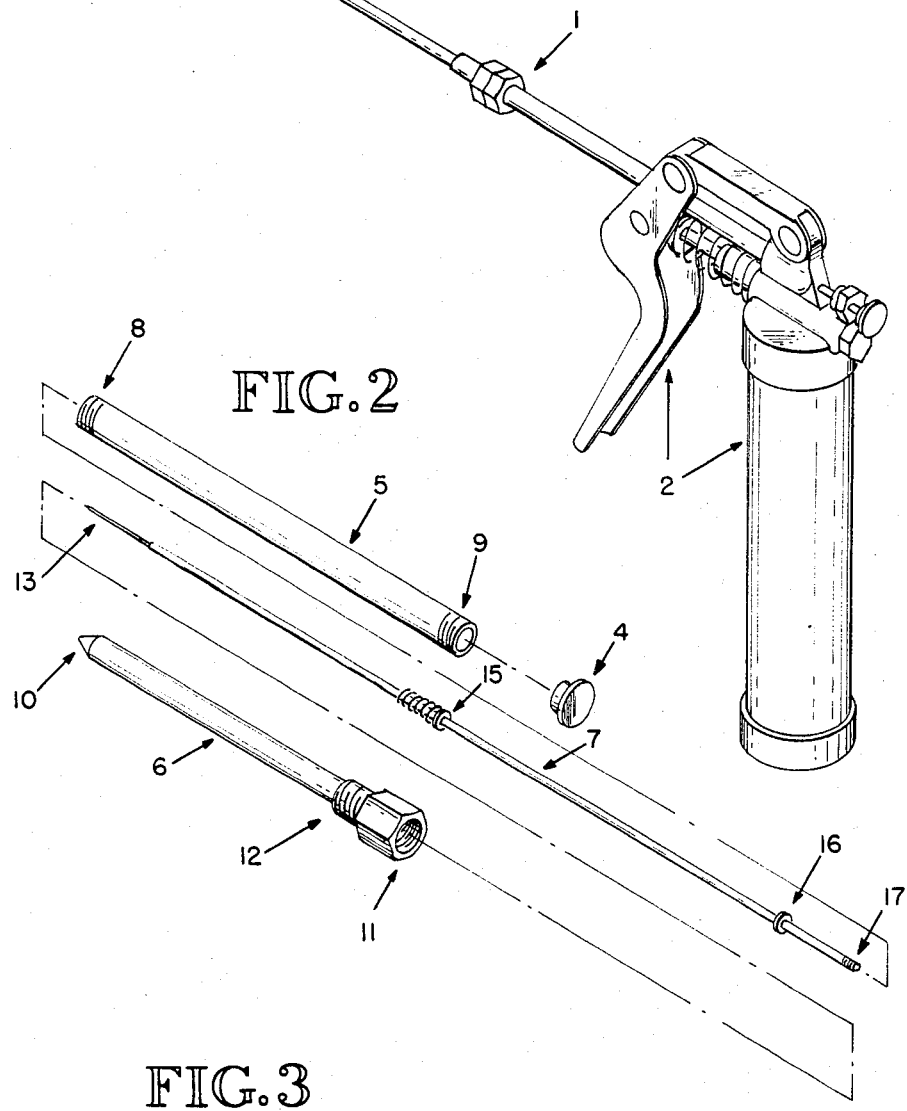
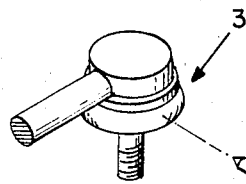
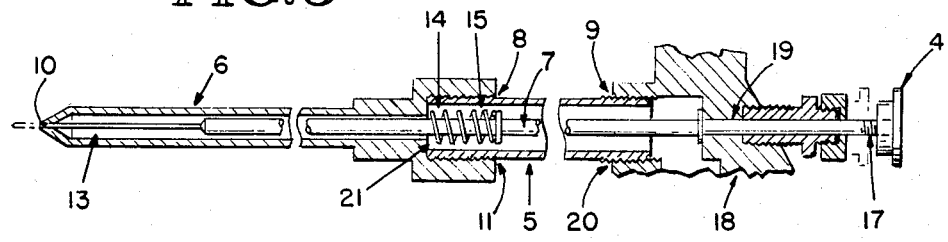

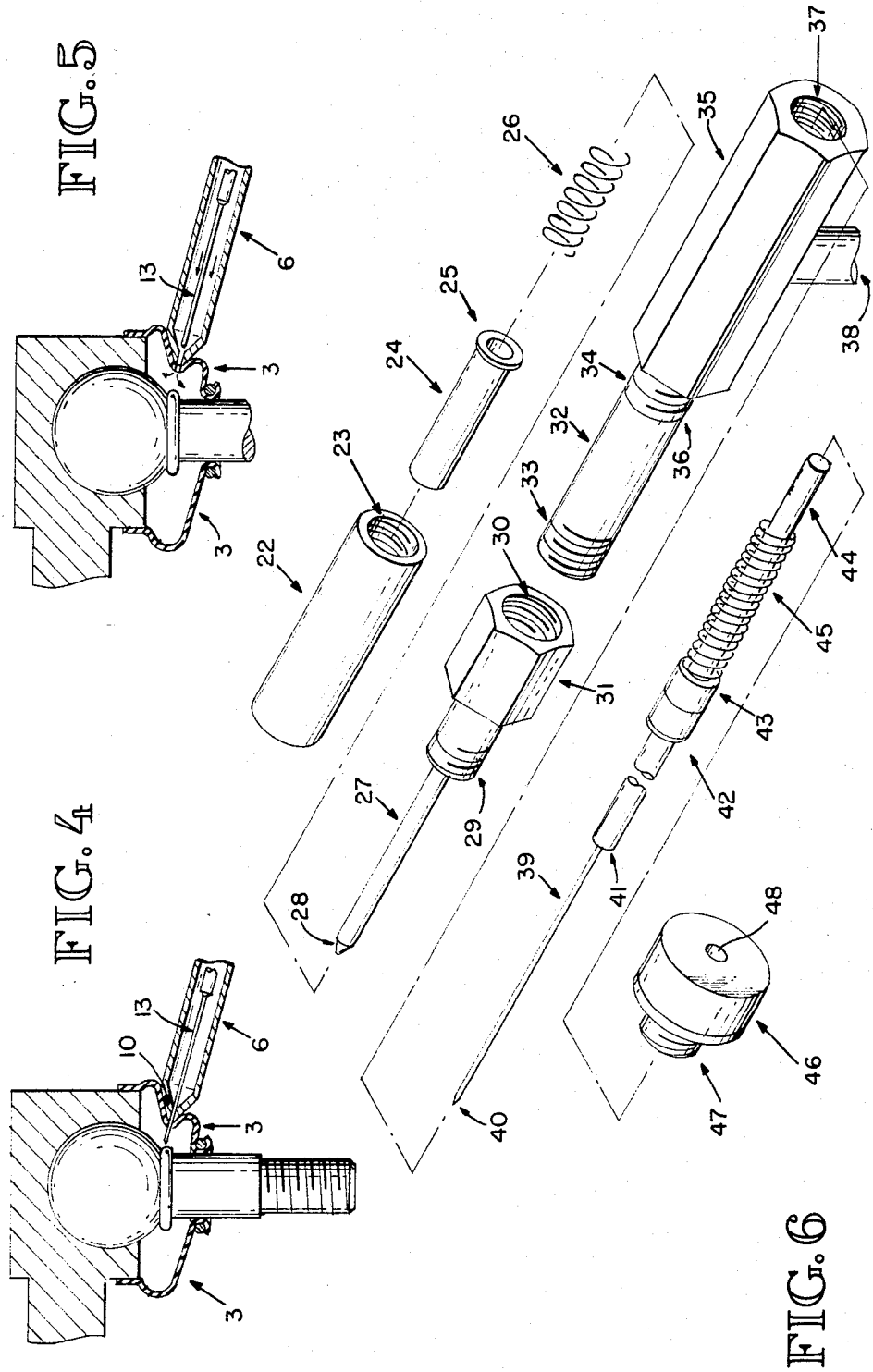

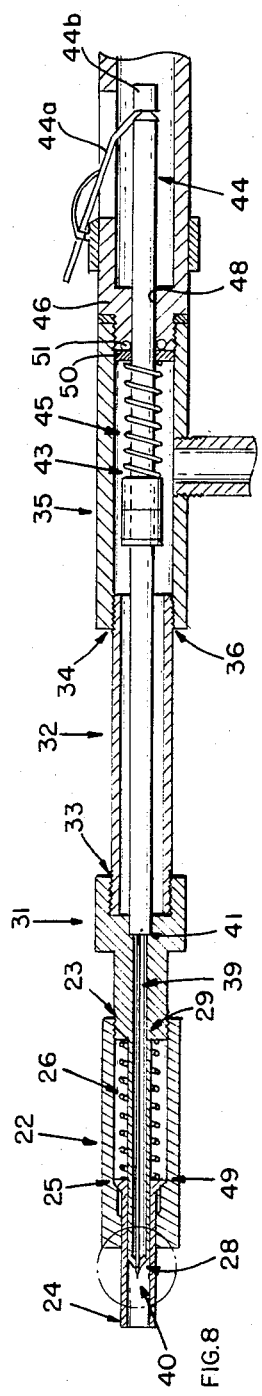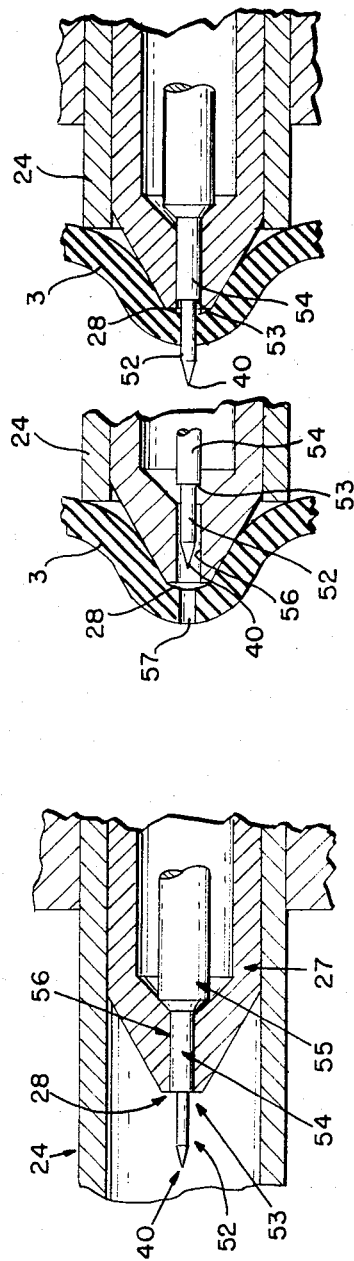

PERFORATING, SEAL-GREASING APPARATUS AND METHOD

DESCRIPTION

1. Technical Field

This invention pertains to tools for greasing sealed joints.

2. Background Art

Automotive-type ball joints and tie rod ends are typically fitted on manufacture with grease encased in a seal of rubber or similar material. Such seals are not intended to be regularly greased. However, such seals may in time be depleted of grease by operational and roadway forces, whereupon destructive stress cracks occur at the collapsed seals' edge. This leads to a substantially expensive replacement of a failed joint.

The present invention is based on the perception that it is possible to insert grease into a so-called "greaseless" seal for a ball joint, tie rod, or similar structure by penetrating the rubber seal with a short, thin needle in such a way as not to affect the structural integrity of the seal. The invention allows such insertion without loss of grease or the introduction of dirt even under profusely dirty conditions. Several embodiments of the invention will achieve this function.

The prior art reveals examples of apparatus utilizing a needle to insert grease into seals of neoprene or similar material. Thus, U.S. Pat. No. 3,554,324 discloses a "Grease Injector Fitment" for lubricating sealed lubrication areas which comprises an elongated needle attached to a pressurizable grease gun. However, such a fitment contemplates use of a relatively long needle of the hypodermic type, which can be imprecise in application, subject to breakage, and possibly dangerous to the operator. Furthermore, use of a needle of relatively large diameter cuts a significant hole in the seal, jeopardizing the structural integrity thereof. Also, use of standard medical hypodermic needles presents practical marketing problems due to their association with illegal drugs.

Other known needle like grease attachments include large diameter probes, referred to as needles, but of a diameter, e.g. ⅛ inch, too large to be used for seal perforation. Another needle attachment is a hollow needle with a zerk fitting attached. This latter needle, due to its length and angular mobility, is not safe to use and difficult to position for hard to reach objects to be greased.

DISCLOSURE OF INVENTION

It is an object of this invention to provide apparatus and a method for greasing sealed joints by piercing the seal with a tiny self-sealing hole and forcing grease through the hole.

It is a further object of this invention to provide a perforating seal greasing apparatus which is inexpensive to construct and easy to operate with standard syringe hubs.

It is a further object of this invention to provide a perforating, seal-greasing apparatus which can be used in the process of original installation of a sealed joint or tie rod end, as, for example, on a robot manufacturing apparatus.

These objects are obtained by providing a grease gun or other pressurizable grease injection mechanism with structure which can (1) pierce a sealed joint with a short needle point to create a tiny self-sealing hole, (2) insert grease under pressure through said hole, and (3) allow said hole to close upon withdrawal of the point and release of the pressure.

BRIEF DESCRIPTION OF THE DRAWINGS

FIG. 1 shows a perspective view of one embodiment of the invention consisting of a grease gun fitted with a hollow grease gun tip which encases a needle point mounted on a support shaft with the needle point normally retracted but capable of extension for piercing the seal. The shaft is pointed toward a sealed tie rod end.

FIG. 2 shows a perspective exploded view of the component parts of the needle, support shaft, extension spring, grease gun tip and other structure of FIG. 1.

FIG. 3 shows a cross-sectional view of the assembled components of FIG. 2.

FIG. 4 shows a cross-sectional view of a seal with the needle point of FIGS. 2 and 3 piercing the seal.

FIG. 5 shows the view of FIG. 4 with the needle point retracted and grease being inserted under pressure through the grease gun tip.

FIG. 6 shows a perspective view of the component parts of a second embodiment of the invention.

FIG. 7 shows a cross-sectional view of the embodiment of FIG. 6 with the needle point mounted on a support shaft in a grease gun tube with the point in the normally extended position but capable of retraction under pressure, the needle point covered by a retractable sheath.

FIG. 8 shows an enlarged cross-sectional view of the forward end of the needle point and tube of the embodiment of FIG. 6 with the needle point and sheath in normal position.

FIG. 9 shows the needle of FIG. 8 with the needle point piercing the seal and the sheath in retracted position.

FIG. 10 shows the needle of FIG. 8 with the needle retracted by grease pressure to allow grease to flow out around the needle.

BEST MODE FOR CARRYING OUT THE INVENTION

Figure 11:
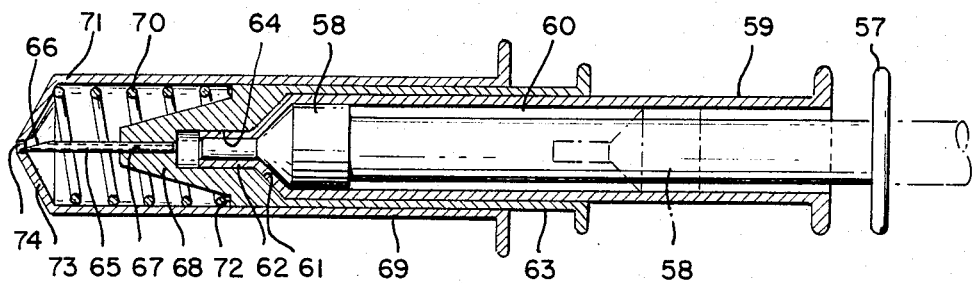
FIG. 11 shows the structure of a third embodiment of the invention with a shortened hollow needle embedded in a hub attached to a disposable syringe.

One embodiment of the invention is illustrated by FIGS. 1 through 5. A second embodiment is illustrated by FIGS. 6 through 9. A third embodiment of the invention is illustrated in FIGS. 10-13.

Beginning with the first embodiment, in FIG. 1 a shaft structure generally indicated at 1 connects to a pressurizable grease gun generally indicated at 2. In operation, the gun 2 with shaft structure 1 is used to insert grease into sealed joints, such as sealed tie rod end 3.

In FIG. 2, the component parts of the needle point, support shaft, and grease gun tip are illustrated. The exterior pieces include a thumb knob 4, a central tube 5, and a grease gun tip 6. The thumb knob 4 contains a threaded female coupling. The central tube contains threaded male couplings on each end 8 and 9. The grease gun tip 6 contains a hole or annulus on the forward end 10. For best performance, the rim edge of the annulus at the forward end must be thin (approximately 5 to 10 one-thousandths of an inch) and smooth in order to hold the tip in immobile contact with the seal 3 during operation. The tip 6 contains a threaded female coupling on the rear end 11 for receiving the forward 8 of the central tube 5. The tip 6 also contains a threaded shoulder 12. A support shaft 7 fits inside the exterior pieces as mounted on the grease gun 2. A thin needle 13 similar to that used in ordinary sewing is supported on the forward end of the support shaft. Suitably spaced midway on the shaft is a retraction spring 14 supported by a ring 15 permanently affixed to the shaft. Suitably spaced further to the rear of the shaft is a second ring 16 for positioning the shaft in its retracted position. The rear end 17 is a threaded male coupling for engaging the thumb knob 4.

In FIG. 3, the component parts of FIG. 4 are assembled on a pressurizable grease gun 18 or applicator (broken away). The shaft 7 with needle 12 is inside the grease gun tip 6 and central tube 5. The extension spring 14 rests on the support shaft 7 between the ring 15 and interior shoulder 21 of the tip 6. The shaft 7 passes through a close-fitting passageway 19 in the grease gun 18. The thumb knob 4 threads onto the rear end 17 of the shaft 7. The forward end 8 of the central tube 5 threads into the rear end 11 of the grease gun tip 6. The rear end 9 of the central tube 5 threads into a receptacle 20 in the grease gun 18.

The first embodiment of FIGS. 1 through 3 operates as illustrated in FIGS. 4 and 5. In its nonoperational position, the needle point 12 is retracted within the grease gun tip 6. In operation, the forward end 10 of the tip 6 is placed in contact with a sealed joint 3. The operator places pressure on the thumb knob 4. This causes the needle tip 12 to protrude through the forward end 10 of the tip 6 and pierce the seal 3 with a small hole. The operator then applies pressure on the pressurizable grease gun 2 in a conventional manner and simultaneously releases the thumb knob 4. The retraction spring 14 causes the shaft 7 and the needle tip 12 to recede from the hole in the seal. Grease flows under pressure around the shaft 7 and forward toward the annulus in the forward end 10 of the grease gun tip 6. As illustrated in FIG. 5, the pressure of the grease causes the hole to remain open and receive grease into the seal. The sharp forward rim of the annulus 10 keeps the gun tip 6 in proper position over the hole in the seal. The operator then releases the pressure on the pressurizable grease gun and removes the tip 6, allowing the hole in the seal 3 to close.

In the first embodiment, it may be desirable to provide a cover or shield of hard material which fits over the tip 6 of the grease gun 2 and engages the threaded shoulder 12 (FIG. 2). This will prevent damage, leakage, or accidents to persons handling the gun when not in use.

Turning now to the second embodiment, in FIG. 6 the component parts of the apparatus are illustrated. A forward tube 22 contains on its rear end a female coupling 23. A forward retractable sheath 24 contains on its rear end a ring 25. A sheath extension spring 26 is of suitable diameter to contact the ring 25. A tip 27 has a hole or annulus in its forward end 28. As with the first embodiment, the rim edge of the annulus at the forward end must be thin, less than 0.011 inches, (preferably approximately 5 to 10 one-thousandths of an inch) and smooth in order to hold the tip in immobile contact with the seal 3 during operation. That is, by keeping the tip forward edge wall thin, the rim edge can depress the seal 3 and prevent grease from escaping around the edge. (See FIG. 8.) The tip 27 has screw threads on the shoulder portion 29 and female coupling threads 30 on its rear part 31. A central tube 32 is threaded on its forward end 33 and rear end 34. A body 35 contains a female coupling on its forward end 36 and rear end 37. The body is hollow and is connectable by a tube 38 to a pressurizable grease source (not illustrated). The shaft 39 contains a needle point 40, shoulders 41, 42 and 43, and a rear end 44. An extension spring 45 is of suitable diameter to contact the shoulder 43. A rear cap 46 contains a threaded male coupling means 47 and a passageway 48.

The component parts of FIG. 6 are assembled as illustrated in FIG. 7. The forward retractable sheath 24 fits inside the forward tube 22. The ring 25 rests against a shoulder 49 inside the tube 22. The extension spring 26 rests on the ring 25. The threaded end 23 of the tube 22 is mated to the threaded shoulder 29 of the tip 27. The support shaft 39 fits inside the tip 27, with the needle point 40 extending out the forward end 28. The extension spring 26 rests on the forward surface of the shoulder 29. The shoulder 41 of the shaft 39 rests against a corresponding shoulder inside the rear part 31 of the tip 27. The forward end 33 of the central tube 32 mates to the rear part 31 of the tip 27. The rear end 34 of the tube 32 mates to the forward end 36 of the body 35. The rear end 44 of the support shaft 39 extends through the passageway 48 in rear cap 46 and 51, which is attached by means 47 to the rear coupling 37 of the body 35. The extension spring 45 rests against the shoulder 43 on the shaft 39 and against the surface of coupling means 47 on the cap 46. The passageway 48 is sealed by conventional washer 50 and O-ring means 46 and 51.

The structure of the needle point 40 is more fully illustrated in FIG. 8. A point portion 52 is sharp on the end and extends back to a shoulder 53. A middle portion 54 extends back to a tapered shoulder 55. The middle portion 54 and tapered shoulder 55 mate closely with the corresponding interior structure of the forward end of the tip 27. The passageway 56 must mate to close tolerances with the middle portion 54. The needle point structure 40 and end 28 are covered in their normal position by the sheath 24.

The embodiment of FIGS. 6 through 8 operates as illustrated in FIGS. 9 and 10. In its nonoperational position, the needle point 40 is extended out through the annulus in the tip 28 and is covered by the sheath 24. In operation, the sheath is placed in contact with the sealed joint 3, as illustrated in FIG. 9. The sheath 24 retracts back inside the forward tube 22 by compressed the extension spring 26. The needle point 40 pierces the seal. Grease from the pressurizable grease source is applied up through tube 38. Since the shaft 39 is blocked from forward travel at shoulder 41 (FIG. 7) but not from backward travel, the pressure within the body 35 and central tube 32 causes the shaft 39 to move backward by contracting the extension spring 45. The needle point 40 moves backward, with the middle portion 54 sliding through the passageway 56. When the shoulder 53 moves back of the passage 56, as illustrated in FIG. 10, grease will flow under pressure around the point portion 52, through the passage 56, through the pierced hole, and into the sealed joint. The pressure of the grease keeps the hole open. The operator withdraws the tip 28 from the seal 3 and releases the grease pressure. The sheath 24 moves to its forward protective position under the pressure of the extension spring 26. The shaft 39 resumes its extended position under the pressure of the extension spring 45 while displacing a finite quantity of grease back into the gun, which is allowed by the absence of a check valve.

In the second embodiment, it may be desirable to provide a means for keeping the shaft and needle retracted after release of the pressure on the grease. For example, this would allow the operator to apply successive strokes of grease without lost motion. This may be accomplished by affixing a conventional spring latch 44a to the body 35 which will engage a suitable collar 44b on the rear end of the support shaft.

The first two embodiments of the invention can be adapted to a number of uses. The first embodiment is well adapted for attachment to a standard grease gun or minigrease gun and use by repair mechanics and others. The second embodiment is adaptable to controlled conditions, such as assembly-line greasing and robot manufacturing techniques.

Figure 12:
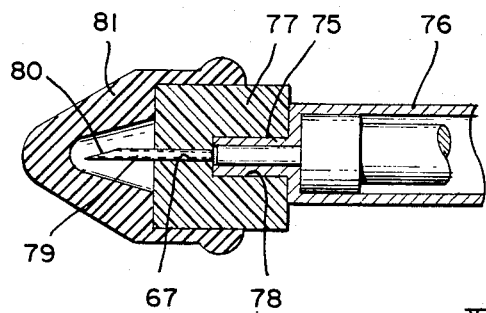
FIG. 12 is a simplified form of disposable syringe.

The third and fourth embodiments illustrated in FIGS. 11 and 12 are adaptable to extremely low-cost construction, making it possible to use disposable grease cartridges.

In the third embodiment, illustrated in FIG. 11, a plunger 57 and a piston 58 fit inside a disposable hollow syringe 59. The syringe 59 contains a reservoir 60. The forward end of the syringe 59 consists of a tapered shoulder 61 and a hollow extension 62. A needle hub 63 is shaped so as to receive the syringe 59. The hollow extension 62 of the syringe 59 press-fits into a cavity 64 in the needle hub 63. A hollow needle 65 with a beveled point at the point 66 press-fits through the passage 67 in the forward end 68 of the hub 63 connecting with the cavity 64 and the extension 62. A needle-protecting shield 69 fits over the hub 63. An extension spring 70 inside the shield 69 engages to the forward end 71 of the shield 69 and a shoulder 72 on the front end of the hub 63. The front surface 73 of the shield 69 contains a passage 74 for projection of the needle 65.

The embodiment of FIG. 11 operates as follows. The combined unit is assembled and sold to customers with grease loaded in the syringe and the plunger 57 in an extended position. The operator presses the front surface 73 of the shield 69 against a sealed joint. The shield 69 retracts back along the hub 63, exposing the needle 65 through the passage 74. The needle 65 pierces the seal. Grease is applied by depressing the plunger 57 forward through the syringe 59. The grease flows through the extension 62 and the needle 65 into the seal. The operator removes the needle, allowing the hole in the seal to close.

The plunger/syringe unit illustrated in FIG. 11 is inexpensive to construct and can be disposed of after one use. A three or five cubic centimeter syringe with a plunge distance of approximately 2 inches may be used. Additional syringes filled with grease can be used with the original hub/shield unit. The hub/shield unit may be injection molded. The configuration of the hub controls the important depth of the penetration into the seal, preventing breakage of the needle inside the seal due to operator error. It effectively shields the needle when the unit is assembled, but not in use. The configuration also eliminates potential marketing problems by rendering the unit inoperable for intravenous drug injection despite its compatibility with standard syringes. To assure this latter advantage, the diameter of the front of the hub sould be not less than twice the distance the needle extends beyond the shield.

In the fourth embodiment, illustrated in FIG. 12, a hollow extension 75 is on the forward end of a disposable syringe 76. The syringe 76 is as illustrated in FIG. 11. A cylindrical hub 77 contains a cavity 78 so configured that the the extension 75 of the syringe 76 press-fits into it. A hollow needle 79 with a beveled point at the tip 80 press-fits through the passage 67 in the forward end of the hub 77 connecting with the cavity 78. A protective cover 81 of hard rubber or similar material fits over the needle 81 and around the hub 77.

As with the third embodiment, the combined unit of the fourth embodiment is supplied with grease in the syringe. The protective cover is removed and grease inserted into seal through the needle by depressing the plunger. The plunger/syringe unit can be disposed of, while the hub unit is reusable. In the alternative the plunger can be saved and packaged with several grease filled syringe reservoirs 60. The fourth embodiment has most of the advantages of the third embodiment, but the hub unit is even less costly to construct.

Figure 13:
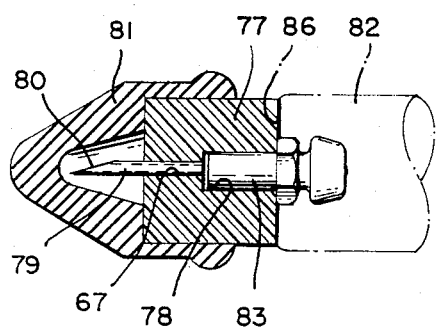
FIG. 13 is a hollow needle embodiment adapted to fit against a conventional grease gun.

The fifth embodiment, illustrated in FIG. 13 is intended to be used with a standard grease gun zerk coupling. A cylindrical hub 77 is provided, as illustrated in FIG. 12. A conventional grease gun coupling unit 82 of the type shown in U.S. Pat. No. 3,589,470, can be removably fastened to a standard zerk fitting which is pressed fitted into the cavity 78 in the hub 77. The zerk coupling unit is so configured that its forward surface 86 rests over a large surface against the rear surface of the hub 77. This contact prevents angular movement of the hub unit in relation to the zerk coupling of the grease gun and makes the needle more accurately positionable when greasing hard to reach objects.

The fifth embodiment of the invention also has the advantage of making a sealed-joint-greasing apparatus attachable to a conventional pressurizable grease gun with a zerk-type fitting.

While the preferred embodiments have been illustrated and described, it will be understood that variations will be apparent to one of ordinary skill in the art. Accordingly, the invention is not to be limited to the specific embodiments illustrated in the drawings.

I claim:

1. A perforating, seal-greasing apparatus comprising:
   a thin, solid needle for piercing resilient sealed joints;
   a support shaft attached to said needle;
   means for encasing said shaft, said encasing means including an annulus larger in diameter than said needle and having a forward edge through which said needle may pass;
   means for moving said encasing means and said needle axially relative to one another to extend and retract the needle through said forward edge of the annulus; and
   means for inserting grease under pressure out through said annulus forward edge into said sealed joint after retraction of said needle from said sealed joint.

2. The apparatus of claim 1 wherein said means for moving the encasing means and said needle relative to one another includes means for moving the support shaft in the encasing means.

3. The apparatus of claim 1, including spring means for holding said support shaft in a normally retracted position with said needle inside said encasing means.

4. The apparatus of claim 1 wherein the forward edge of said annulus in said encasing means is less than 0.011 of an inch in thickness and substantially smooth.

5. The apparatus of claim 1, including spring means for holding said support shaft in a normally extended position with said needle protruding through said annulus in said encasing means.

6. The apparatus of claim 5 wherein the forward edge of said annulus in said encasing means is less than 0.011 of an inch in thickness and substantially smooth.

7. The apparatus of claim 5, including a retractable protective sheath covering said needle.

8. The apparatus of claim 5, including a releasable latch means for holding the support shaft in a retracted position.

9. A method of perforating and lubricating sealed joints made of a material that is self-sealing if perforated by a small hole, comprising:
  piercing said seal with a needle to create a small self-closing hole;
  withdrawing said needle and inserting grease under pressure through said hole into said seal; and
  releasing said pressure to stop the flow of grease and allowing said self-sealing material to seal said hole.

\* \* \* \* \*